United States Patent
Landais et al.

(10) Patent No.: US 6,588,416 B2
(45) Date of Patent: Jul. 8, 2003

(54) RADIANT DEVICE WITH GAS BURNER AND RECIRCULATION, ADAPTED IN VIEW OF REDUCED PRODUCTION OF NITROGEN OXIDES

(75) Inventors: Thierry Landais, Paris (FR); Thierry Bellin-Croyat, Montmorency (FR)

(73) Assignee: Gaz de France (GDF) Service National, Paris (FR)

( * ) Notice: Subject to any disclaimer, the term of this patent is extended or adjusted under 35 U.S.C. 154(b) by 0 days.

(21) Appl. No.: 10/167,771

(22) Filed: Jun. 11, 2002

(65) Prior Publication Data

US 2003/0003413 A1 Jan. 2, 2003

(30) Foreign Application Priority Data

Jun. 29, 2001 (FR) .............................. 01 08665

(51) Int. Cl.[7] ................................ F23D 11/44
(52) U.S. Cl. .................... 126/91 A; 431/158; 431/215; 431/353
(58) Field of Search ................... 126/91 A; 431/116, 431/158, 215, 166, 353

(56) References Cited

U.S. PATENT DOCUMENTS

| 4,401,099 | A | * | 8/1983 | Collier | 126/91 A |
| 4,673,350 | A | * | 6/1987 | Collier | 431/353 |
| 4,705,022 | A | * | 11/1987 | Collier | 126/91 A |
| 4,850,334 | A | * | 7/1989 | Cassagne et al. | 126/91 R |
| 4,894,006 | A | * | 1/1990 | Cassagne et al. | 431/116 |
| 5,127,826 | A | * | 7/1992 | Acton et al. | 431/350 |
| 5,241,949 | A | * | 9/1993 | Collier | 126/91 A |
| 5,570,679 | A | | 11/1996 | Wunning | 126/91 A |
| 6,024,083 | A | * | 2/2000 | Smirnov | 126/91 A |
| 6,321,743 | B1 | * | 11/2001 | Khinkis et al. | 126/91 A |

FOREIGN PATENT DOCUMENTS

| DE | 4420477 | | 12/1995 |
| FR | 2616520 | | 12/1988 |
| FR | 2616518 | * | 7/1989 |
| GB | 824010 | | 11/1959 |

* cited by examiner

Primary Examiner—Alfred Basichas
(74) Attorney, Agent, or Firm—Ladas & Parry

(57) ABSTRACT

The invention relates to a radiant device with a burner of the "glove finger" type, comprising an exchanger (3) for heating air (T1) by the burned gases (T2), a furnace tube (6) drilled with air-intake orifices (60) and terminated by a nozzle (61) disposed facing a recirculation tube (4), and a central gas-injection tube (7). According to the invention, the central injection tube (7) is fed with gaseous fluids in proportions that can be regulated by means of one or two valves (710, 720), via two conduits (71, 72), the first (71) of which transports at least gas and the second (72) of which transports at least air, and the central injection tube (7) ends at a burner (8), which is disposed in the furnace tube (6) and which discharges at the level of the nozzle (61), this arrangement making it possible to adapt existing devices very easily for the purpose of reduced production of nitrogen oxides.

5 Claims, 2 Drawing Sheets

US 6,588,416 B2

RADIANT DEVICE WITH GAS BURNER AND RECIRCULATION, ADAPTED IN VIEW OF REDUCED PRODUCTION OF NITROGEN OXIDES

FIELD OF THE INVENTION

The invention relates in general to a gas-burner system with a radiant tube known as "glove finger", permitting the burned gases to be discharged at very high rate.

BRIEF DESCRIPTION

More precisely, the invention relates to a radiant device with gas burner and recirculation of burned gases for heating a vessel bounded by a wall, this device comprising in longitudinal axial direction a section external to the vessel and a section both internal to the vessel and divided into three internal subsections disposed successively at increasing distance from the wall and, in inward radial direction, an envelope comprising an external casing and an internal envelope tube, the end of which remote from the wall is closed, an exchanger disposed in the envelope and extending over a portion of the external section and over the first two internal sections, a recirculation tube extending over the third internal section at a radial distance from the envelope tube and having open inlet and outlet ends respectively relatively close to and relatively far from the wall of the vessel, a retaining tube internal to the exchanger and extending over a portion of the external section and over the first internal section, a furnace tube disposed in the exchanger, retained by the retaining tube in the extension thereof and extending over the second internal section, and a central injection tube transporting the gas, extending at least into the retaining tube and traversing a partition separating the retaining tube from the furnace tube, the exchanger comprising a separating tube that defines with the retaining tube and the furnace tube an air intake path starting in an intake inlet drilled in the casing and ending at intake orifices drilled in the furnace tube, the separating tube defining with the envelope a smoke-exhaust path ending at an exhaust outlet drilled in the casing, and the furnace tube ending in a nozzle disposed facing the inlet end of the recirculation tube.

BACKGROUND OF THE INVENTION

A device of this type is known in the prior art, as illustrated in particular by French patents 2616518 and 2616520 and used with success for many years.

Precisely because the design of these devices is so relatively old, it was necessary that they be subjected to a new study, justified by the constant desire to reduce the emissions of nitrogen oxides, whose formation conditions are better known today than in the past.

Nevertheless, inasmuch as these devices have a long service life and were installed in large numbers, the design of new devices with reduced emission of nitrogen oxides also had to solve the problem posed by rehabilitation of old devices.

As it happens, this context excludes in practice recourse to the known solutions for reduction of the emissions of nitrogen oxides, either by providing a movable injector as described in, for example, German Patent 4420140, or in providing means for physically displacing the combustion zone, as described in, for example, U.S. Pat. No. 5,570,679.

Under these conditions, the objective of the invention is therefore to propose a device which on the one hand emits only a negligible level of nitrogen oxides and on the other hand differs from a known device only by entirely minor adaptations of structural nature.

OBJECTS OF THE INVENTION

To this end, the device of the invention, which furthermore is in conformity with the generic definition given in the foregoing preamble, is essentially characterized in that the central injection tube is fed by two conduits, the first of which transports at least gas and the second of which transports at least air, in that the central injection tube ends at a burner disposed in the furnace tube and discharging at the level of the nozzle, and in that a valve is interposed in at least one of the conduits, outside the casing.

According to one possible embodiment of tile invention, the first conduit, for example, transports gas and the second conduit transports air, the central injection tube then being composed of a single injection blowpipe in which the first and second conduits discharge.

In this case, it is advisable at least that the aforementioned valve be interposed in the second conduit, to control the air flowrate.

According to another possible embodiment of the invention, the first conduit, for example, transports gas and the second conduit transports a mixture of air and gas, the central injection tube then being composed of two concentric injection blowpipes in which the first and second conduits discharge respectively.

In this case it is advisable at least that the aforementioned valve be interposed on the first conduit, to control the gas flowrate.

BRIEF DESCRIPTION OF THE DRAWINGS

Other characteristics and advantages of the invention will become clear from the description thereof hereinafter, by way of indication and in no way limitative, based on the attached drawings, wherein.

DETAILED DESCRIPTION OF THE INVENTION

Figure 1:
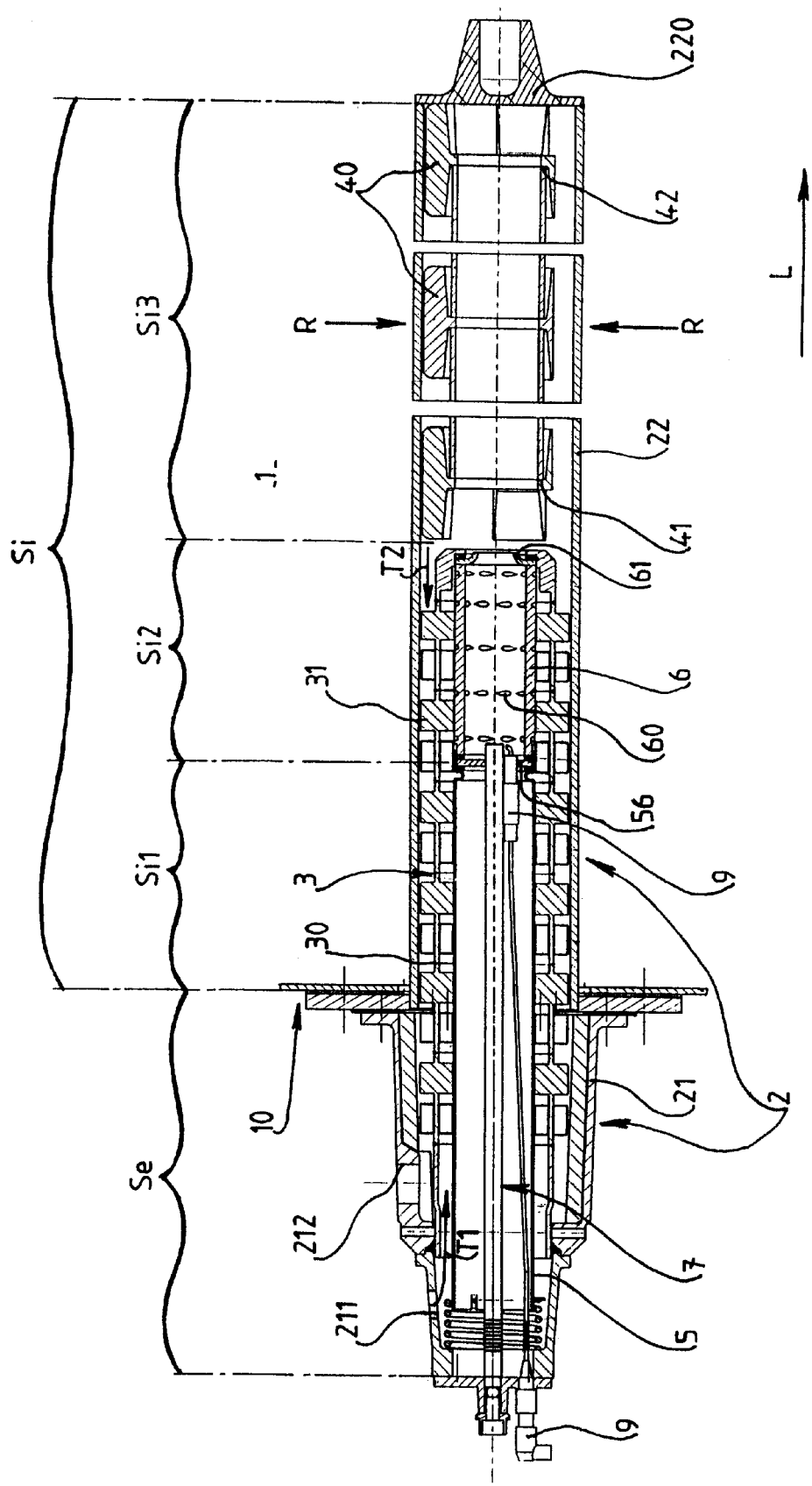
FIG. 1 is a longitudinal section of a known device.

As indicated hereinabove, the invention relates to a radiant device with gas burner and recirculation of burned gases, capable of heating a vessel 1 bounded by an insulating wall 10.

This device extends generally in longitudinal axial direction L, along which it has a section Se external to vessel 1 and a section Si internal to the vessel.

As the two figures show, internal section Si is itself divided into three internal subsections Si1, Si2 and Si3, which are successively disposed at increasing distance from wall 10.

In addition, this device is formed from a plurality of layers disposed successively in inward radial direction R, or in other words from the layer closest to the surface to the deepest layer.

At the surface, the device is bounded by an envelope 2, which comprises a casing 21 external to vessel 1 and an envelope tube 22 internal to vessel 1, the envelope tube having a closed end 220 remote from wall 10.

In the layer immediately following envelope 2 there is disposed an exchanger 3, which is followed by a recirculation tube 4.

As shown in the figures, exchanger 3 extends over a portion of external section Se and over the first two internal sections Si1 and Si2, while recirculation tube 4 extends over third internal section Si3, at a radial distance from envelope tube 22.

Recirculation tube 4 has an inlet end 41 relatively close to wall 10 of the vessel and an outlet end 42 relatively far from this wall 10, both of these ends being open.

This recirculation tube 4, which is made of ceramic, for example, is retained radially in envelope tube 22 by means of connecting pieces 40, also of ceramic, and in such a way that its outlet end 42 is free of end 220 of the envelope tube.

In the interior of exchanger 3 there is disposed a retaining tube 5 and a furnace tube 6.

Retaining tube 5 extends over part of external section Se and over first internal section Si1 and, in its extension, retains furnace tube 6, which in turn extends over second internal section Si2.

Finally, a central injection tube 7, which transports the gas, extends into retaining tube 5 and traverses a partition 56 separating retaining tube 5 from furnace tube 6.

Exchanger 3 comprises a separating tube 30 equipped with ribs 31 that retain it between envelope 2 on the one hand and retaining tube 5 and furnace tube 6 on the other hand.

Separating tube 30 cooperates with retaining tube 5 and furnace tube 6 to define an air-intake path T1, which begins at an intake inlet 211 drilled in casing 21 and ends at air-intake orifices 60 drilled in furnace tube 6.

In addition, separating tube 30 cooperates with envelope 2 to define a smoke-exhaust path T2, which ends at an exhaust outlet 212 drilled in casing 21.

Finally, as shown in the figures, furnace tube 6 ends in a nozzle 61, which is disposed facing inlet end 41 of recirculation tube 4.

In the case of the known device (FIG. 1), central injection tube 7 discharges just downstream from partition 56 into furnace tube 6, whose interior forms a combustion chamber, a high-voltage ignition system 9 being provided to ensure lighting of the gas at the outlet of injection tube 7.

Figure 2:
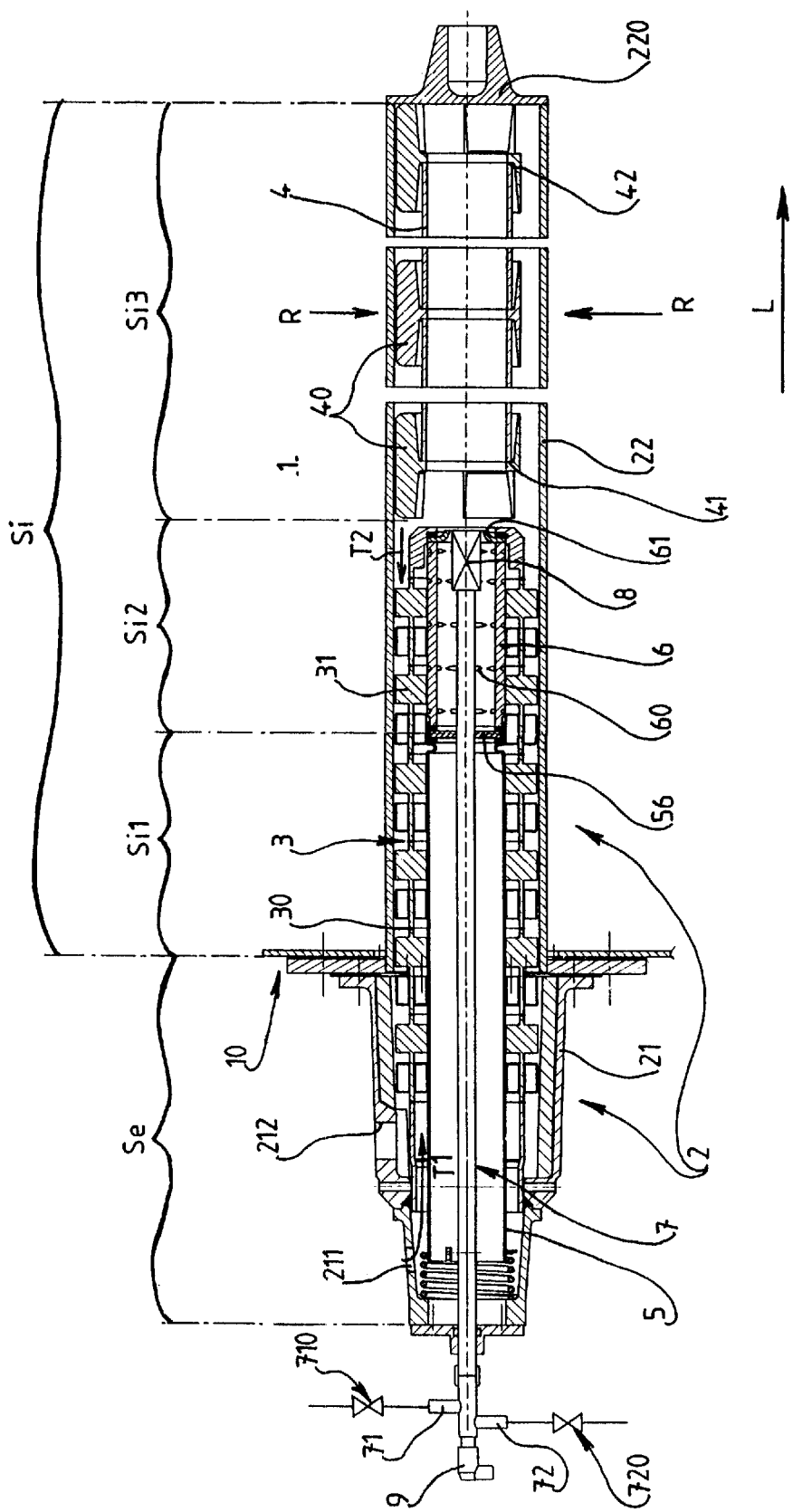
FIG. 2 is a longitudinal section of a device according to the invention, resulting from an adaptation of the known device of FIG. 1.

Compared with this known arrangement, the device of the invention (FIG. 2) exhibits very few structural differences.

Firstly, instead of being fed only by gas, central injection tube 7 is fed by two conduits 71 and 72, the first 71 of which transports at least gas and the second 72 of which transports at least air.

Secondly, this central injection tube 7 ends at a burner 8, which is disposed in furnace tube 6 and which discharges at the level of nozzle 61, meaning that its outlet is situated flush with nozzle 61.

Finally, outside casing 21, there is interposed a valve such as 710 and 720 on one of the conduits, and preferably on each of the conduits 71 and 72.

The device according to the invention can be used in two different modes of operation, corresponding to two structural versions, each of which has two successive phases.

In the first version, first conduit 71 transports gas, second conduit 72 transports air and central injection tube 7 is composed of a single injection blowpipe, into which conduits 71 and 72 discharge.

In the first phase of operation of this first version, the two valves 710 and 720 are open to moderate flowrate, and central injection tube 7 transports the gas and air that it receives in the form of a mixture to burner 8.

The second phase begins when the temperature in third section Si3 has reached a value at which it is certain that an intense flame will be stable.

Air valve 720 is then closed, gas valve 710 is opened to maximum flowrate and the resulting partial vacuum at the level of nozzle 61 creates a very strong air draft through air intake 211, whereupon the device operates at full capacity.

In the second version, first conduit 71 transports gas, second conduit 72 transports a mixture of air and gas, and central injection tube 7 is composed of two concentric injection blowpipes, into which conduits 71 and 72 discharge respectively.

In the first phase of operation of this second version, valve 710 is closed, valve 720 is open and central injection tube 7 transports the mixture of air and gas that it receives from conduit 72 to burner 8.

The second phase begins when the temperature in third section Si3 has reached a value in which it is certain that an intense flame will be stable.

Gas valve 710 is then opened to maximum flowrate, and the resulting partial vacuum at the level of nozzle 61 creates a very strong air draft through air intake 211, whereupon the device operates at full capacity.

What is claimed is:

1. A radiant device with gas burner and recirculation of burned gases for heating a vessel (1) bounded by a wall (10), this device comprising in longitudinal axial direction (L) a section (Se) external to the vessel (1) and a section (Si) both internal to the vessel and divided into three internal subsections (Si1, Si2, Si3) disposed successively at increasing distance from the wall (10) and, in inward radial direction (R), an envelope (2) comprising an external casing (21) and an internal envelope tube (22), the end (220) of which remote from the wall (10) is closed, an exchanger (3) disposed in the envelope (2) and extending over a portion of the external section (Se) and over the first two internal sections (Si1, Si2), a recirculation tube (4) extending over the third internal section (Si3) at a radial distance from the envelope tube (22) and having open inlet (41) and outlet (42) ends respectively relatively close to and relatively far from the wall (10) of the vessel, a retaining tube (5) internal to the exchanger (3) and extending over a portion of the external section (Se) and over the first internal section (Si1), a furnace tube (6) disposed in the exchanger (3), retained by the retaining tube (5) in the extension thereof and extending over the second internal section (Si2), and a central injection tube (7) transporting the gas, extending at least into the retaining tube (5) and traversing a partition (56) separating the retaining tube (5) from the furnace tube (6), the exchanger (3) comprising a separating tube (30) that defines with the retaining tube (5) and the furnace tube (6) an air intake path (T1) starting in an intake inlet (211) drilled in the casing (21) and ending at intake orifices (60) drilled in the furnace tube (6), the separating tube (30) defining with the envelope (2) a smoke-exhaust path (T2) ending at an exhaust outlet (212) drilled in the casing (21), and the furnace tube (6) ending in a nozzle (61) disposed facing the inlet end (41) of the recirculation tube (4), wherein the central injection tube (7) is fed by two conduits (71, 72), the first (71) of which transports at least gas and the second (72) of which transports at least air, in that the central injection tube (7) ends at a burner (8) disposed in the furnace tube (6) and discharging at the level of the nozzle (61), and in that a valve (710, 720) is interposed in at least one (72) of the conduits (71, 72), outside the casing (21).

2. A device according to claim 1, wherein the first conduit (71) transports gas, in that the second conduit (72) transports air, and in that the central injection tube (7) is composed of a single injection blowpipe in which the first and second conduits (71, 72) discharge.

3. A device according to claim 2, wherein the valve (720) is interposed in the second conduit (72), to control the air flowrate.

4. A device according to claim 1, wherein the first conduit (71) transports gas, in that the second conduit (72) transports a mixture of air and gas, and in that the central injection tube (7) is composed of two concentric injection blowpipes in which the first and second conduits (71, 72) discharge respectively.

5. A device according to claim 4, wherein the valve (710) is interposed in the first conduit (71), to control the gas flowrate.

* * * * *